(12) United States Patent
Van De Graaf et al.

(10) Patent No.: US 12,485,038 B2
(45) Date of Patent: *Dec. 2, 2025

(54) IMPLANTABLE TUBE VALVE (71) Applicant: Choice B.V., Eindhoven (NL)

(72) Inventors: Peter Van De Graaf, Sevenum (NL); Erwin Dekkers, Eindhoven (NL); Simon Plukker, Eindhoven (NL); Jorg Stroetzel, Venlo (NL)

(73) Assignee: Choice B.V., Eindhoven (NL)

( * ) Notice: Subject to any disclaimer, the term of this patent is extended or adjusted under 35 U.S.C. 154(b) by 306 days.

This patent is subject to a terminal disclaimer.

(21) Appl. No.: 18/023,150

(22) PCT Filed: Aug. 25, 2021

(86) PCT No.: PCT/NL2021/050520
§ 371 (c)(1),
(2) Date: Feb. 24, 2023

(87) PCT Pub. No.: WO2022/045885
PCT Pub. Date: Mar. 3, 2022

(65) Prior Publication Data
US 2023/0310205 A1  Oct. 5, 2023

(30) Foreign Application Priority Data
Aug. 27, 2020 (NL) .................. 2026357

(51) Int. Cl.
*A61F 6/24* (2006.01)
*A61B 17/12* (2006.01)
*A61F 6/20* (2006.01)

(52) U.S. Cl.
CPC .......... *A61F 6/24* (2013.01); *A61B 17/12099* (2013.01); *A61F 6/202* (2013.01)

(58) Field of Classification Search
CPC .... A61F 6/24; A61F 6/202; A61F 6/22; A61F 6/20; A61F 6/02; A61B 17/12099;
(Continued)

(56) References Cited

U.S. PATENT DOCUMENTS 8,616,212 B1   12/2013  Logan

FOREIGN PATENT DOCUMENTS

WO   WO 2013/144770 A2   10/2013
WO   WO 2016/036248 A1   3/2016

OTHER PUBLICATIONS

European Patent Office, International Search Report in corresponding International Application No. PCT/NL2021/050520, dated Nov. 24, 2021 (2 pages).

*Primary Examiner* — Ophelia A Hawthorne
(74) *Attorney, Agent, or Firm* — Leydig, Voit & Mayer, Ltd.

(57) ABSTRACT

Implantable tube valve for implanting in a human vessel, comprising a tube, having an inner and outer tube wall extending between two axial tube ends and comprising a valve member, connected to a pivot shaft supported by the tube, with the valve member pivotable between an open position and a closed position and comprising an actuator mechanism, mounted on the outer In tube wall and comprising a pivot member, arranged for driving the pivot shaft from the outer tube wall by an actuation force from the actuator mechanism and comprising at least one biasing element, connected to the pivot member and arranged for preloading the pivot member to bistably bias the valve member towards the open or closed position, wherein the pivot member is substantially curved, having a curvature following a contour of the inner tube wall to limit a lateral extension of the implantable tube valve.

14 Claims, 8 Drawing Sheets (58) Field of Classification Search
CPC .... A61B 17/12; Y10S 128/918; A61M 39/22; A61M 2039/226; A61M 2039/229; A61M 2205/04; A61M 2205/8287; A61M 2210/14; A61M 2210/16; A61M 2210/163
See application file for complete search history.

IMPLANTABLE TUBE VALVE

CROSS-REFERENCE TO RELATED APPLICATIONS

This patent application is a U.S. National Phase of PCT International Application No. PCT/NL2021/050520, filed Aug. 25, 2021, which claims priority to Dutch Application No. 2026357, filed Aug. 27, 2020.

FIELD OF INVENTION

The invention relates to an implantable tube valve for implanting in a human vessel.

DESCRIPTION OF THE PRIOR ART

Implantable tube valves for implanting in human vessels like the urinary tract, vas deferens, or fallopian tube, such as disclosed in EP3188699 provide a reliable and efficient solution that can be switched on and off at will. Typically, the inner diameter of such vessels is smaller than three millimeter. For these sizes, the publication discloses an implantable tube with a valve member that is pivotable within the tube, between an open position and closed position. The open position is designed to minimally restrict the passage of human fluids, cells or particles, e.g. blood, lymphatic fluid, egg or sperm cells, urine, or other secretion. Conversely, the closed position is designed to block the passage of such fluids, cells or particles. Purposes can be found in e.g. birth control, incontinence treatment, blood/kidney dialysis, or controlled draining of excess fluid from the body.

The valve member of the implantable tube described in EP3188699 is driven by an actuator mechanism comprising a pivot member. The pivot member converts a force from the actuator into a rotation of the valve member, that may open or close the implantable tube device. Due to the small size of the device, manufacturability and quality of the final product are essential aspects that need to be considered during the design. A problem with this type of pivot member, however, is that it increases the lateral extension of the tube when mounted in the tube wall, which limits the available space for passage through the implantable tube valve, thereby potentially reducing the effectivity of the device.

For these dimensions it is difficult to propose a solution for a pivot member that is easy to manufacture and assemble, and that can be mounted into the wall of an implantable tube valve without significantly increasing the thickness of the tube wall.

SUMMARY OF THE INVENTION

In one aspect, it is aimed to provide an implantable tube valve with a pivotable tube valve member that is biased towards an open or closed position by a biasing arrangement that is easy to manufacture and assemble. An implantable tube valve is provided that can be implanted in a human vessel, and that comprises a tube with an inner and outer tube wall extending between two axial tube ends and a valve member mounted inside the inner tube wall.

The valve member is pivotable between an open position and a closed position. The valve member is connected to a pivot shaft supported by the tube. The pivot shaft is connected to a pivot member driven by an actuation mechanism. The implantable tube valve further comprises at least one biasing element connected to the pivot member and arranged for bistably biasing the valve member towards the open or closed position.

The pivot member is substantially curved, having a curvature following a contour of the inner tube wall to limit a lateral extension of the implantable tube valve.

In some embodiments, the tube comprises a cavity between the inner and outer tube wall, for enclosing at least the pivot member. This may limit the lateral extension of the implantable tube valve even further.

Additionally or alternatively, the biasing element at least comprises two bow-shaped rods that are interconnected at both ends in a mirrored fashion. In an example embodiment, each bow-shaped rod has a middle section with an increased bending stiffness with respect to a distal and proximal end section bending stiffness.

Optionally, the implantable tube valve may comprise an actuator mechanism with a heating circuit arranged for heating shape memory alloy tension wires by means of an electrical current, causing an actuation force on the pivot member by reversible contraction of the tension wires. In an example embodiment, a tension wire is mechanically connected to at least two respective terminals of the heating circuit at one end, to provide a current running therethrough, and mechanically connected to the pivot member at another end, so that the current runs through the tension wire without branching off to the pivot member. This allows the electrical current for heating the at least one tension wire to be contained within the tension wires instead of flowing through other components which could cause undesired welding effects.

Preferred embodiments are described in the dependent claims.

BRIEF DESCRIPTION OF THE DRAWINGS

The invention will be further elucidated in the figures.

DETAILED DESCRIPTION

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. The term "mount" is used in its ordinary meaning to emphasize that many mounting arrangements are possible. These arrangements include physical shaft mounts, ball bearing mounts or any other mechanical arrangement providing a rotational degree of freedom for the valve member mounted in the mount. The rotational degree of freedom defines an axis of rotation or pivot axis that is transverse to the implantable tube. Preferably, the mount is formed partly by the tube, and a corresponding mount part formed by the valve member.

By the term 'extending continuously' e.g. between axial tube ends, it is indicated that there are no substantial deviations present between said extensions, notably no or very limited protruding outer features, in respect of the implantable tube. In particular, the implantable tube extending continuously between the axial tube ends indicates that there is no or very limited spatial deviation from the tube form along the entire tube. The term continuous does nevertheless not preclude the presence of minor protrusions or depressions, e.g. for forming an actuator housing, sealing edge, mounting or valve seat on a smaller scale or for forming a rugged surface e.g. for fixed insertion in the human vessel, e.g. in the form known for stents. It is indicated on a larger scale that the general flow through the object may be unobstructed due to the tube's continuous form, or that the object itself does not substantially deviate from a tube form. In particular, depending on its application, the actuator actuating the valve member is shaped in elongated form along the tube in a way that can be absorbed by stretching the surrounding tissue.

A 'heating circuit' may comprise one or more analog or digital hardwire elements configured to perform operational acts in accordance with the present systems and methods, such as to provide control signals to the various other module components. The processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multipurpose integrated circuit. Any type of processor may be used such as dedicated or shared one. The processor may include micro-controllers, central processing units (CPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that maybe part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems as set forth in the claims that follow. The specification and drawings are accordingly to be regarded in an illustrative manner and are not intended to limit the scope of the appended claims.

Any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage.

Figure 1:
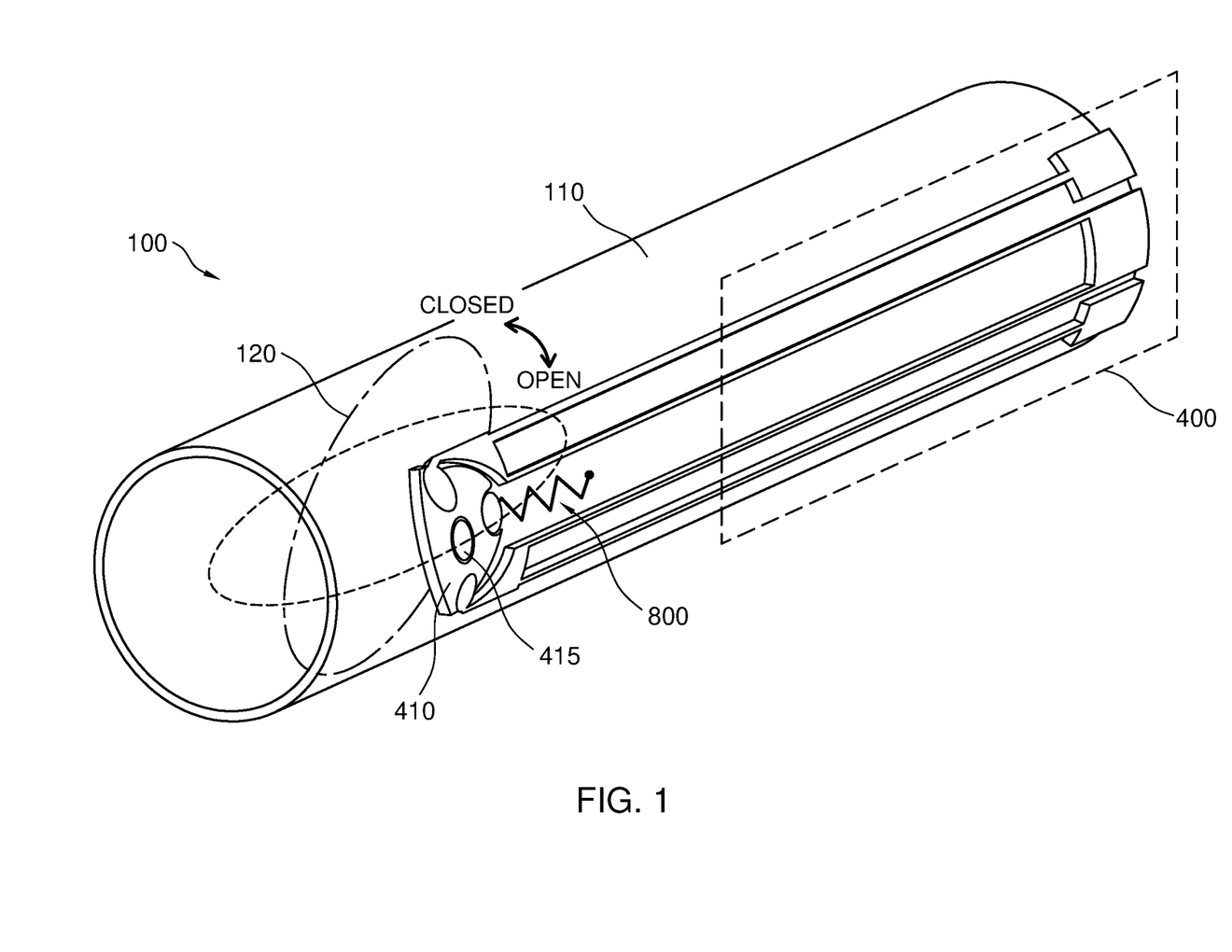
FIG. 1 shows an embodiment of an implantable tube valve comprising a curved pivot member.

Turning now to FIG. 1, there is illustrated an embodiment of an implantable tube valve 100, comprising an implantable tube 110 having an inner and outer tube wall extending between two axial tube ends. The implantable tube valve 100 further comprises a valve member 120 mounted on a pivot shaft 415 which is supported by the tube 110, with the valve member pivotable between an open and closed position, allowing or closing off passage through the tube 110, respectively. A pivot member 410 is arranged for driving the pivot shaft 415 from the outer tube wall by an actuation force from an actuator mechanism 400. The implantable tube valve 100 comprises a biasing element 800 connected to the pivot member 410 and arranged for preloading the pivot member 410 to bistably bias the valve member 120 towards the open or closed position. The pivot shaft 415 rotates the valve member 120 between an open position and a closed position. The pivot member 410 is substantially curved, having a curvature following a contour of the inner tube wall to limit a lateral extension of the implantable tube valve 100. The pivot member 410 can for example be manufactured out of a base material tube, e.g. by laser cutting or water-jet cutting. Preferably, the radius of curvature of the base material tube is chosen to match the radius of curvature of the implantable tube 110 as close as possible, with a small radial clearance gap to allow rotation of the pivot member 410, as explained later on in this application with reference to FIG. 2. Accordingly, this may result in a pivot member that is easy to manufacture and assemble, and that can be mounted into the wall of an implantable tube valve with a minimal increase of the thickness of the tube wall.

Figure 2:
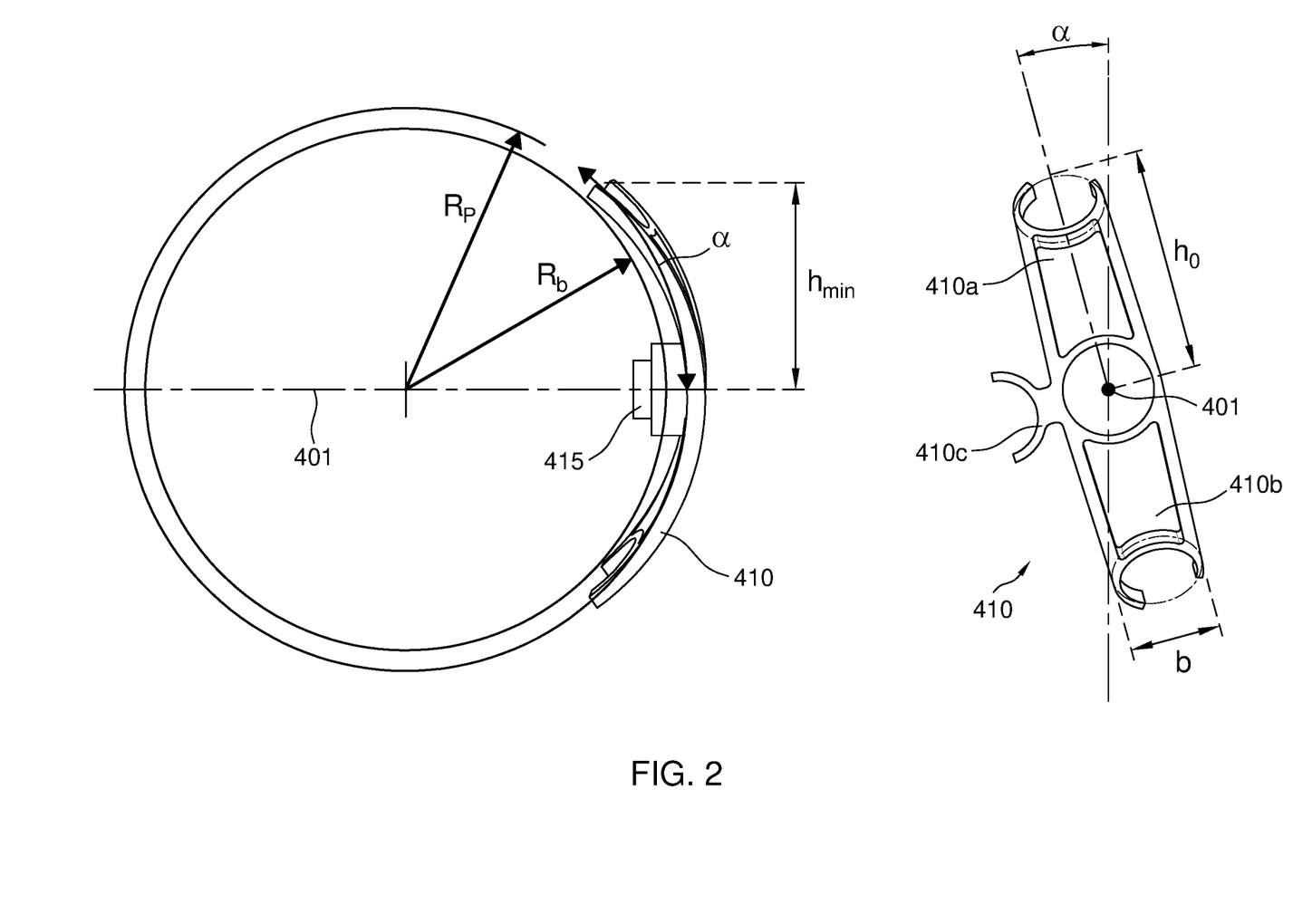
FIG. 2 shows a preferred embodiment of a curved pivot member.

FIG. 2 shows a preferred embodiment of a pivot member 410, which substantially reduces the wall thickness of the tube 110 required to enclose the pivot member 410, compared to other types of pivot members. The pivot member 410 has a curved inner and outer surface, of which the center of curvature is located on the pivot axis 401 of the pivot shaft 415. In the specific embodiment shown in FIG. 2, the inner and outer surface of the pivot member 410 are cylindrically curved with a center of curvature coinciding with the center of curvature of the inner tube wall. Alternatively, the inner and outer surface of the pivot member 410 may have a non-constant radius of curvature or may comprise straight segments.

The pivot member 410 is shown essentially having three mounts radially extending from the pivot shaft 415. Two opposing mounts 410a and 410b are arranged for transferring the actuation force from the actuator mechanism to the pivot shaft. For this purpose, mounts 410a and 410b may comprise cylindrically rounded cutouts for mounting the actuator connectors 450. One mount 410c is arranged for transferring the preload force from the biasing element (not shown) to the pivot shaft. Mount 410c may be extending perpendicularly to the opposing mounts 410a and 410b and may comprise a rounded cutout for mounting the biasing element 800. Alternatively, the pivot member 410 may comprise any other number of mounts for transferring actuation or preload forces, placed at any other orientation with respect to the pivot shaft 415 and to each other, as deemed suitable for actuation and biasing of the valve member 120.

The pivot member 410 and its mounts 410a, 410b and 410c may be an integrally formed part comprising cutouts, holes or pockets to remove excess material, e.g. for reducing the weight or for increasing structural flexibility if preferred or required. Alternatively, the pivot member 410 may be assembled from multiple parts and may comprise areas with different material properties or thickness.

The embodiment of the pivot member 410 of FIG. 2 preferably has a radius of curvature that is bigger than the outer radius of curvature of the tube 110. The difference between these radii provides a radial gap between the tube 110 and the pivot member 410 that allows a rotation of the pivot member 410 around the pivot axis 401 over a pivot angle, of which a minimum value is required to fully open and close the valve member 120.

However, any radial gap also undesirably increases the lateral extension of the implantable tube valve 100. Therefore, the radial gap is preferably optimized to a minimum radial gap such that the allowed rotation over pivot angle $\alpha$ is just sufficient to functionally operate the valve member 120, while the lateral extension of the implantable tube valve 100 is minimized. This can be done by means of Equation 1, $$\text{alpha} = \arccos\left(\sqrt{\frac{R_B^2 - R_P^2\cos^2\left(\frac{2a}{\pi}\right)}{R_P^2\sin^2\left(\frac{2a}{\pi}\right) + \frac{b^2}{4}}}\right) - \arctan\left(\frac{b}{2R_P\sin\left(\frac{2a}{\pi}\right)}\right) \quad (1)$$

wherein alpha equals the pivot angle of the pivot member 410 in radians, $R_P$ and $R_B$ equal, respectively, the radius of curvature of the pivot member 410 and the tube 110, b equals the width of the pivot member 410 at the end of the opposing mounts 410a and 410b, and a equals the length of the curved segment of one of the opposing mounts 410a or 410b with height $h_0$ and radius of curvature $R_P$, and can be calculated by Equation 2.

$$a = R_P \arctan\left(\frac{h_0}{R_P}\right) \quad (2)$$

Preferably, the distance between the cylindrically rounded cutouts for mounting the actuator connectors on the two opposing mounts 410a and 410b is large, i.e. about 60-90% of the tube diameter ($2R_B$), so as to increase the transmission ratio between the actuation force provided by tension wires M1, M2 and the resulting actuation torque on the pivot shaft 415. The same holds for other types of connections between tension wires M1, M2 and pivot member 410. However, for given radii of curvature of the pivot member 410 and the tube 110, an increasing distance (i.e. increased $h_0$) leads to a decreasing pivot angle. Similarly, an increasing width of the pivot member 410 at the end of the opposing mounts 410a and 410b leads to a decreasing pivot angle.

Therefore, using Equations 1 and 2 the geometrical properties of a curved pivot member 410 can be chosen such that, for a given tube 110 diameter and a given pivot angle, the pivot member can be placed as close as possible to the inner tube wall such that the lateral extension of the implantable tube valve 100 is minimalized.

Figure 3:
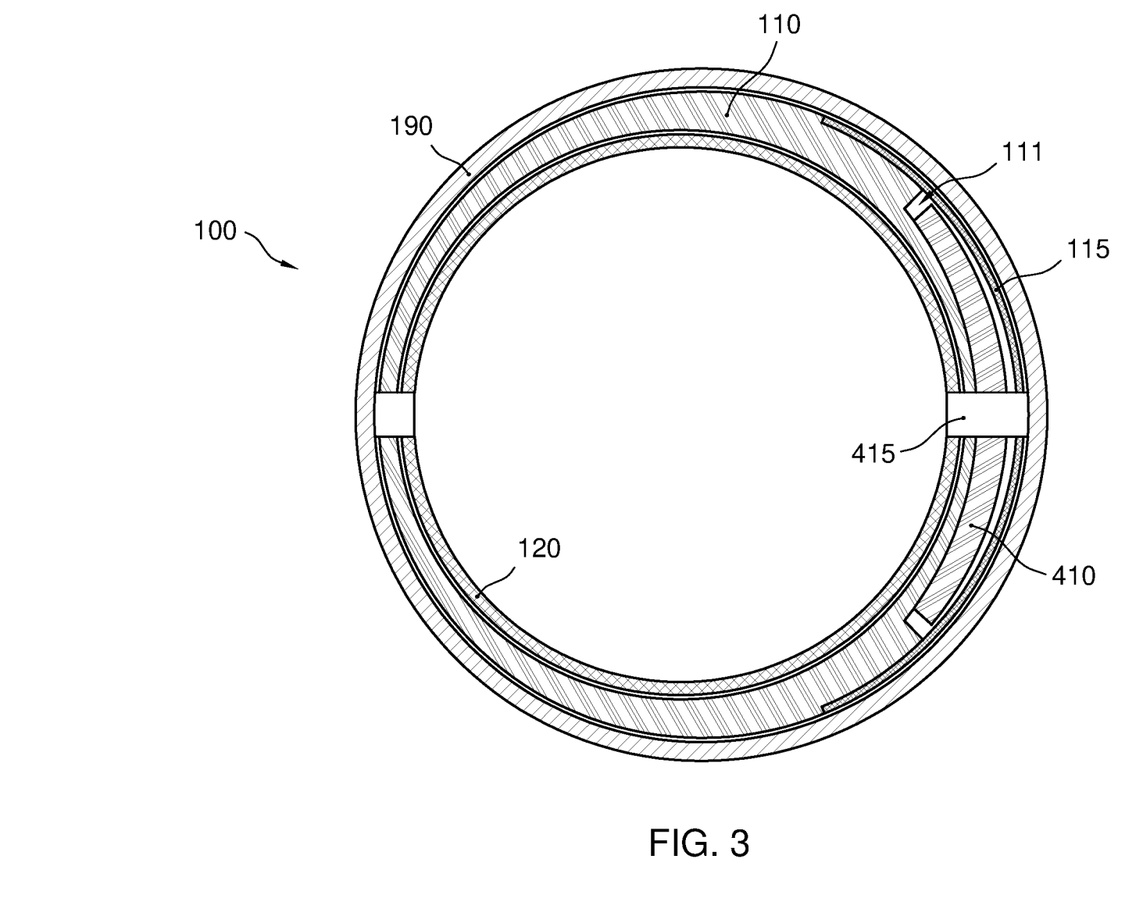
FIG. 3 provides an axial plane cross section view of an implantable tube valve comprising a curved pivot member.

FIG. 3 provides an axial plane cross section view of an implantable tube valve 100, comprising an embodiment of a pivot member 410 with a curved inner and outer surface concentrically aligned with the tube 110 to limit the lateral extension of the implantable tube valve 100. The pivot member 410 is mounted on a pivot shaft 415, supported by the tube 110 and able to pivot the valve member 120 between an open position (as shown in FIG. 3) and a closed position. The inner tube wall of tube 110 may be eccentrically aligned with the outer tube wall of tube 110, such that the wall thickness of tube 100 is largest on one side of the tube 110. Alternatively, the inner tube wall may be concentrically aligned with the outer tube wall, such that the tube 110 has an equal wall thickness around the circumference.

One side of the tube 110, e.g. the side with the largest wall thickness, may comprise at least one cavity 111 such that elements of the implantable tube valve, e.g. the pivot member 410, actuator (not shown) and biasing element (not shown), can be enclosed within the tube wall. Preferably, the cavity is covered by a cover 115 such that a smooth outer contour of the tube 110 is created. The tube 110 may comprise more than one cavity or channel covered by more than one cover, e.g. if preferred from a functional point of view to accommodate elements of the implantable tube valve on different sides of the tube 110, or if preferred from a manufacturing or assembly point of view. Multiple cavities or channels may be interconnected. Alternatively, the tube 110 may be assembled from multiple parts such that an at least partially hollow tube wall is created for accommodating elements of the implantable tube valve.

In other or further embodiments, the inner tube wall of tube 110 is eccentrically aligned with the outer tube wall of tube 110, whereas the cover 115 is an integrally formed part of the tube 110 forming an enclosure for mounting elements of the implantable tube valve 100, e.g. pivot member 410, actuator, biasing element, within the tube wall on the side of the tube with the substantially larger wall thickness.

Preferably, the volume of the cavity 111 is substantially curved, to house the curved pivot member 410

For example, to take up minimal space for the actuator, cavity 111 can be formed by having an outer, e.g. spherical shape, and inner tube, containing the valve 120. If the midpoint of the spherical shape lies eccentric to the midpoint of the inner tube, a greater surface appears on the other eccentric side. If this surface is hollowed out, a curved or angled cavity 111 may be created. In this cavity 111 a pivot member 410 can be mounted with a shape that resembles the contour of the interior space. Such a pivot member 410 may not be able to rotate full circle, since it would be blocked by the inner tube wall. However, a sufficient rotation angle may be allowed within the cavity 111, enough to pivot the valve member 120 through the pivot shaft 415 between the open and closed position.

Figure 4:
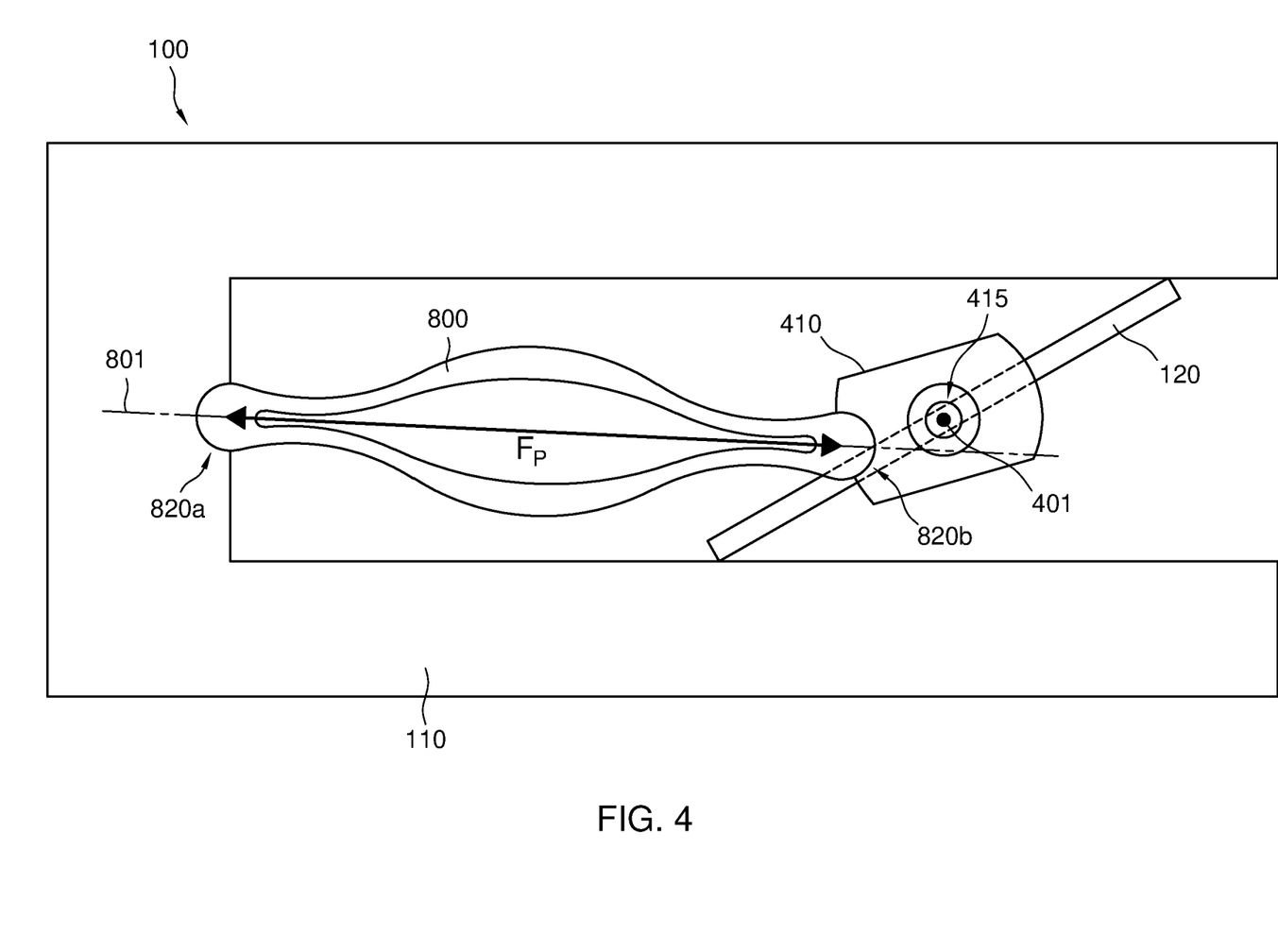
FIG. 4 shows a further embodiment of implantable tube valve comprising a curved pivot member and a biasing element.

FIG. 4 shows a further embodiment of implantable tube valve comprising a curved pivot member 410 and a biasing element 800. In the illustrated embodiment, the pivot member 410 is connected to the valve member 120, extending eccentrically from a pivot axis 401 defined by pivot shaft mount 415, and is driven by an actuator (not shown).

The biasing element 800 is mounted to the tube 110 and the pivot member 410 and arranged to exert a biasing force $F_P$ between them, arranged for resulting in a preloading torque on the valve member 120. The pivot member 410 and the tube 110 comprise cylindrically rounded cutouts that match cylindrically rounded ends 820a and 820b on the biasing element 800, such that the biasing element 800 is mounted to the tube 110 in a way that allows rotation along the contour of the cylindrically rounded end 820a and to the pivot member 410 in a way that allows rotation along the contour of the cylindrically rounded end 820b.

Alternatively, the biasing element 800 may be connected to the tube 110 and/or the pivot member 410 in other ways to exert a biasing force between the two, e.g. by bearings such as knife-edge bearings. Alternatively, the biasing element 800 may be an integral part of the tube 110 and/or the pivot member 410.

The pivot member 410 preferably is a substantially curved element comprising a central hole for mounting to the pivot shaft 415 and a cylindrically rounded cutout on an edge of the pivot member for mounting the cylindrically rounded end 820b of the biasing element 800 at a radial distance from the pivot shaft 415. However, the pivot member 410 may be any differently shaped body suitable for the transmission of the biasing force into a preloading torque on the valve member 120, e.g. a body containing a crank or lever.

The biasing element 800 is mounted to the tube 110 such that, in uncompressed state of the biasing element 800, the valve member 120 is bistably biased to either an open or closed position.

Upon rotation of the pivot member 410 by an actuator, such that e.g. the valve member 120 is pivoted away from an open position or closed position, the biasing element 800 is compressed until it reaches a neutral state, in which the centerline 801 of the biasing element 800 intersects the pivot axis 401 of the pivot shaft 415. In this neutral state, the biasing element is maximally compressed, thus exerting a maximum force between the tube 110 and the pivot member 410 but without a resulting torque on the pivot member 410. If the pivot member is rotated away from the neutral state, the built up force in the biasing element 800 is released into a torque on the pivot member 410, thereby biasing the valve member 120 to a closed or open position. As such, the biasing element 800 opposes the rotation of the pivot member 410 when rotating towards the neutral state, and assists the rotation of the pivot member 410 when rotating away from the neutral state.

In some embodiments, the pivot member is designed as a separate part on the outside of the tube 110, leading to only a very minute extension of the implantable tube valve 100 in lateral direction. This extension may be between 10 and 100 micron. The pivot member 410 is preferably designed having an inwardly curved inner and outer surface to further limit the lateral extension of the implantable tube valve 100.

The depicted connection by means of cylindrically rounded ends 820a and 820b allows for a flush connection between the biasing element 800 and pivot member 410. This limits the lateral extension of the implantable tube valve 100. Alternative connections such as a knife-edge bearing or elastic bearing between the biasing element 800 and the pivot member 410 may provide the same benefit.

In other or further embodiments, the biasing element 800 is formed by two bow-shaped rods that are interconnected at both ends in a mirrored fashion. This arrangement allows for a very compact arrangement that can be manufactured in very minute dimensions e.g. manufactured out of thin plate material, potentially as a single piece, and can easily be assembled into an implantable tube valve, necessary for applications in human vessels.

Figure 5:
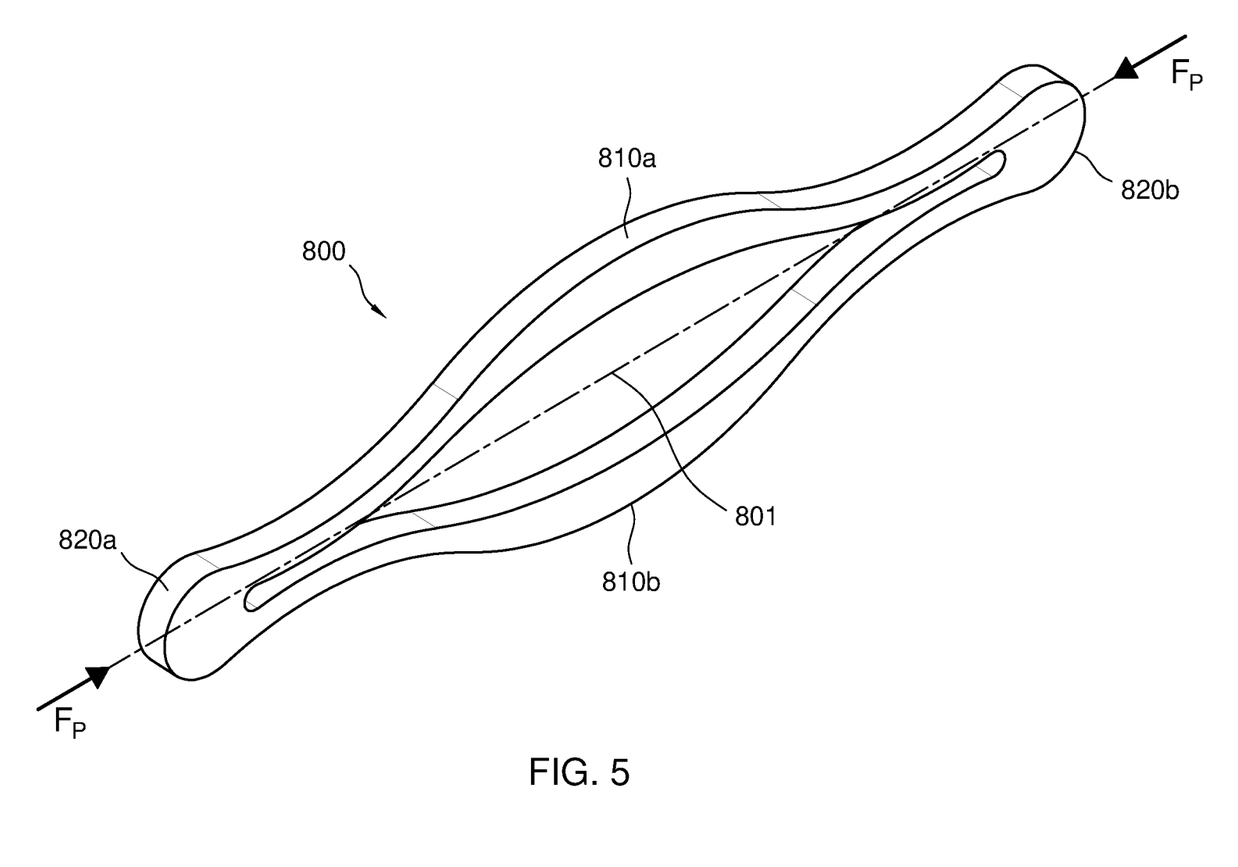
FIG. 5 shows a biasing element 800 according to a further embodiment.

FIG. 5 shows a biasing element 800 according to a further embodiment. The biasing element 800 comprises two bow-shaped rods 810a and 810b that are interconnected at their ends in a mirrored fashion. The biasing element 800 comprises cylindrically rounded ends 820a and 820b. The bow-shaped rods 810a and 810b may form a compression spring that shortens, e.g. along centerline 801 upon exertion of an external force $F_P$ between ends 820a and 820b. Due to the bow shape of the rods 810a and 810b, the compression stiffness CD of the biasing element 800 is defined by the bending stiffness of the rods 810a and 810b. The biasing element 800 preferably is an integrally formed planar structure with uniform thickness, e.g. formed out of a plate or a tube.

Alternatively, the biasing element 800 may be composed of several parts that are assembled, e.g. the bow-shaped rods 810a and 820b may be manufactured individually and later assembled to form the biasing element 800. The individual parts may be formed out of different materials with different structural properties. The biasing element 800 may also comprise a non-uniform thickness to alter its functional behavior, e.g. parts of the biasing element 800 may have e.g. larger thickness, flanges or raised edges to increase the stiffness of those parts.

Similarly, parts of the biasing element 800 may comprise e.g. smaller thickness, holes, pockets or cutouts to reduce the stiffness of those parts. Although the biasing member is quite scalable in dimensions, for human vessels it can be manufactured in very minute dimension, e.g. with a length dimension of about 2-10 mm and with a thickness of about 2-100 micrometer.

Figure 6:
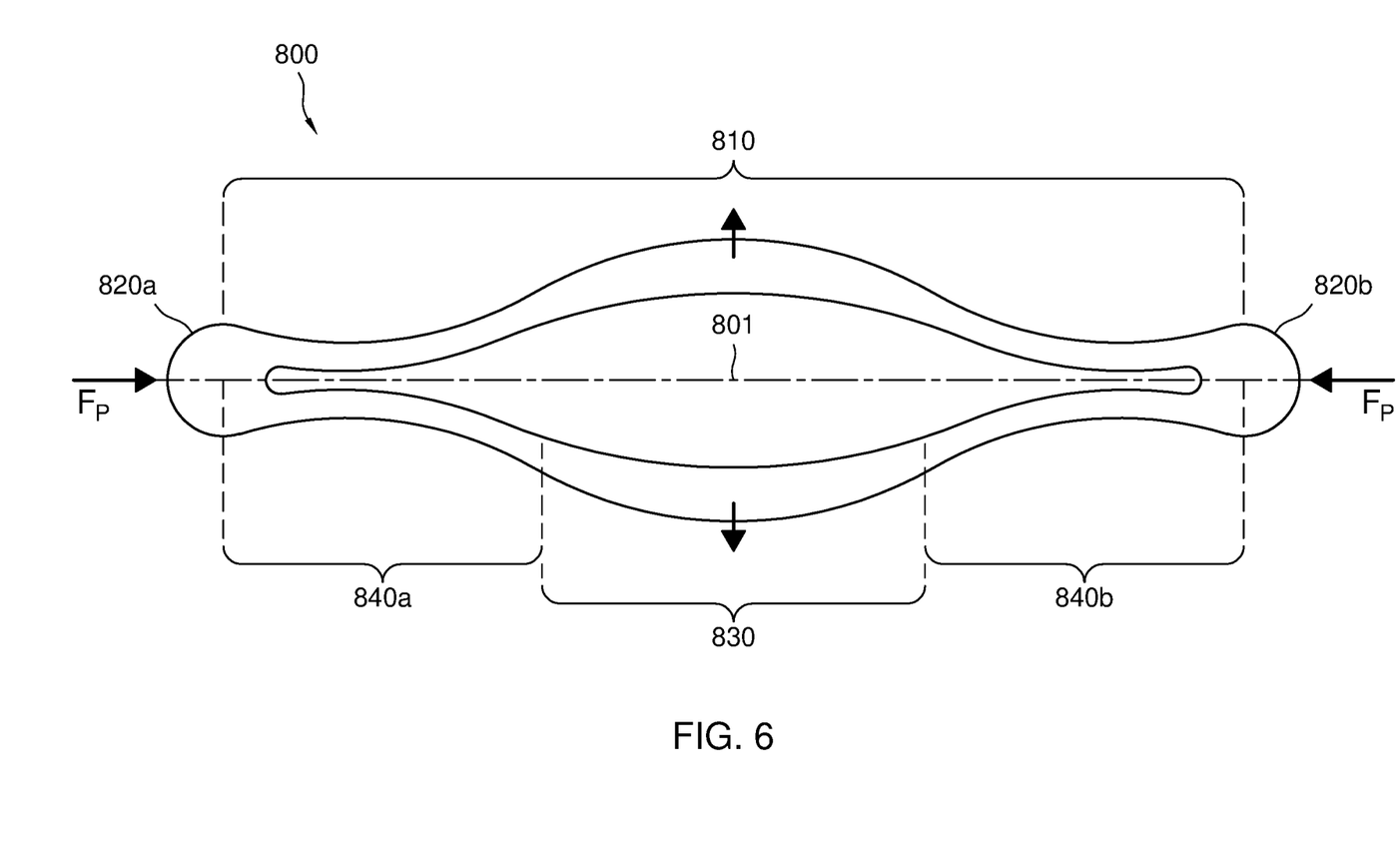
FIG. 6 shows in detail the embodiment of the biasing element of FIG. 5.

FIG. 6 shows in detail the embodiment of the biasing element 800 of FIG. 5. The biasing element 800 preferably is a planar structure comprised of interconnected bow-shaped rods 810 and two cylindrically rounded ends 820a and 820b. Upon an external compressive force $F_P$ exerted on the ends 820, the biasing element 800 shortens along the centerline 801 and widens in a lateral in-plane direction, caused by a bending deformation of the bow-shaped rods 810. To avoid bending or buckling of the biasing element 800 in an out-of-plane direction, the biasing element 800 may be built into an enclosure that restricts any out-of-plane movement of the biasing element 800 or parts thereof. Alternatively, the biasing element 800 may have an out-of-plane bending or buckling stiffness larger than an in-plane bending stiffness.

Each bow-shaped rod preferably comprises a middle section 830 and two end sections 840a and 840b. The middle section 830 may have a larger cross section area than the end sections 840, thus providing a bending stiffness at the middle section 830 higher than at the end sections 840. In some embodiments, the bow-shaped rods 810 are interconnected at their end sections 840a and 840b in a mirrored fashion, wherein the mirroring plane is defined by the centerline 801 of the biasing element 800 and a normal to a frontal plane of the biasing element 800.

In a preferred embodiment, the biasing element 800 has a symmetrical shape, both horizontally and vertically. As such, the biasing element 800 may be described having four quadrants, which are symmetrically mirrored along a horizontal and vertical centerline with respect to each other. Accordingly, each quadrant may for example comprise half of a rounded end 820a, 820b. From there, end section 840a, 840b of bow-shaped rod 810 may initially curve inward, towards horizontal centerline 801. Next, end section 840a, 840b may curve outward, away from horizontal centerline 801. Preferably, end section 840a, 840b transitions into middle section 830, which may run parallel to horizontal centerline 801, while the cross section area of the bow-shaped rod gradually increases. In some embodiments, the cross section area may reach a maximum at a vertical centerline (not shown) of the biasing element, e.g. running through the center of middle sections 830 of the two bow-shaped rods 810.

Figure 7A:
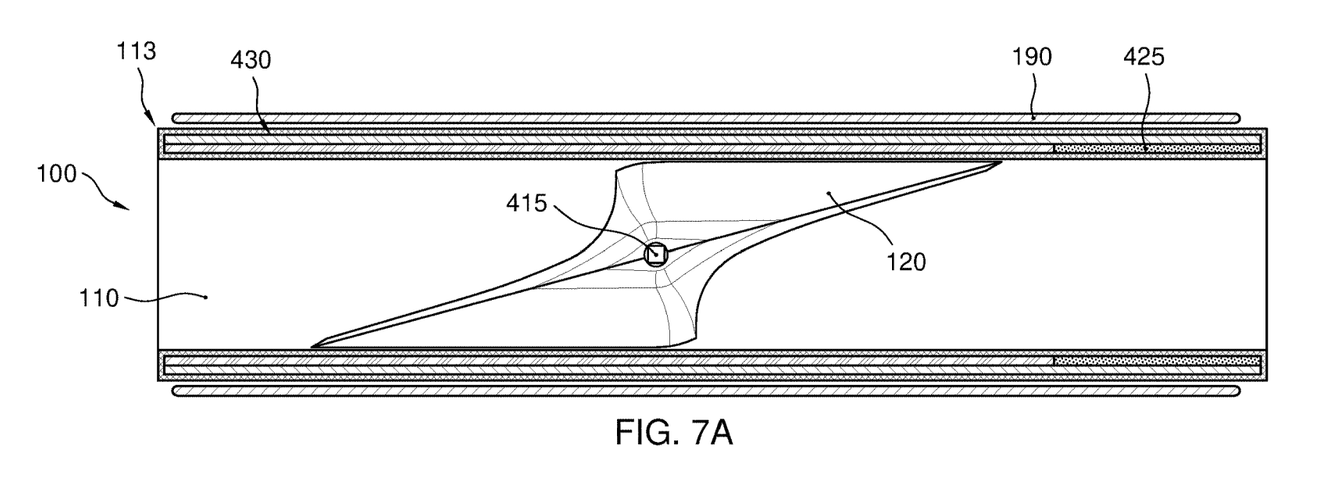
FIGS. 7A and 7B show another embodiment of an implantable tube valve comprising a curved pivot member and a biasing element.
Figure 7B:
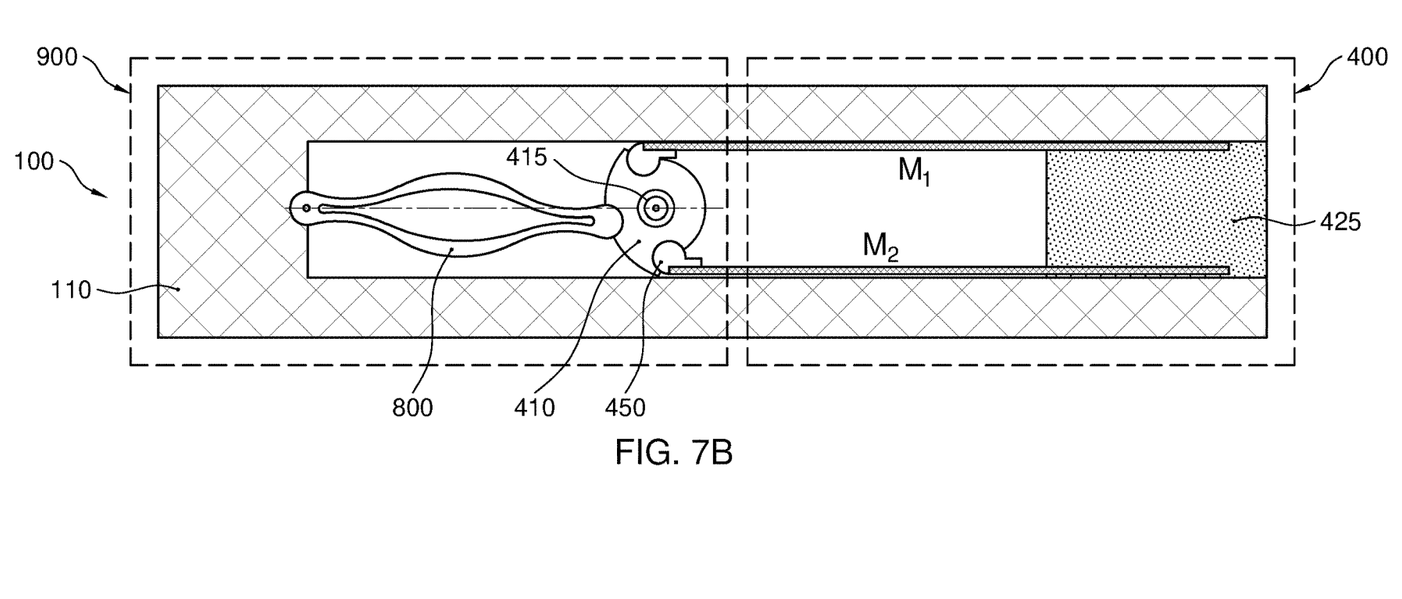

In FIGS. 7A and 7B, there is illustrated another embodiment of an implantable tube valve 100. FIG. 7A provides a section view of the implantable tube valve 100, showing a valve member 120 mounted on a pivot shaft 415 which is supported by a tube 110. The pivot shaft 415 rotates the valve member 120 between an open position and a closed position, allowing or closing off passage through the tube 110, respectively. The embodiment of FIG. 7A further shows the tube 110 comprising a tube contour 113, enclosing a heating circuit 425 part of an actuator 400.

FIG. 7B provides a detailed view of the implantable tube valve 100, showing an actuator 400 and a biasing arrangement 900 integrated in the wall of the tube 110. The actuator 400 comprises a heating circuit 425 and tension wires $M_1$ and $M_2$. The tension wires $M_1$ and $M_2$, when heated over a certain length may result in substantial contraction of the tension wires, resulting in actuation forces on the pivot member 410. The actuation forces are converted by the pivot member 410 into an actuation torque on the pivot shaft 415 for opening or closing the valve member 120. This tension wire arrangement is especially advantageous in the context of the present disclosure, but can also be used to good purpose in other actuators, notably of a type having an elongated geometry such as tubes, cylinders or bars.

Pivot member 410 is connected to valve member 120, extending eccentrically from a rotation axis defined by pivot shaft 415, and is driven by the actuator 400. The actuator 400 comprises a heating circuit 425 and first and second tension wires $M_1$, $M_2$ formed of a shape metal alloy, connected to the heating circuit 425 and connected by means of actuator connectors 450 on opposite sides of the pivot member 410 along the tube wall, thereby connecting the pivot member 410 to a position fixed relative to the tube 110, so that, in use, the valve member 120 is pivoted in open position by heating the first tension wire $M_1$ and the valve member 120 is pivoted in closed position by heating the second tension wire $M_2$. A number of variations are possible, e.g. by inverting the wire geometry and using push instead of pulling arrangements of the tension wires. Preferably, the tension wires $M_1$, M2 are of a form that contracts when heated. Shape metal alloy suitable for such may for instance be a NiSn alloy known as Nitinol, but other shape metal alloys can be used to purpose.

Figure 8:
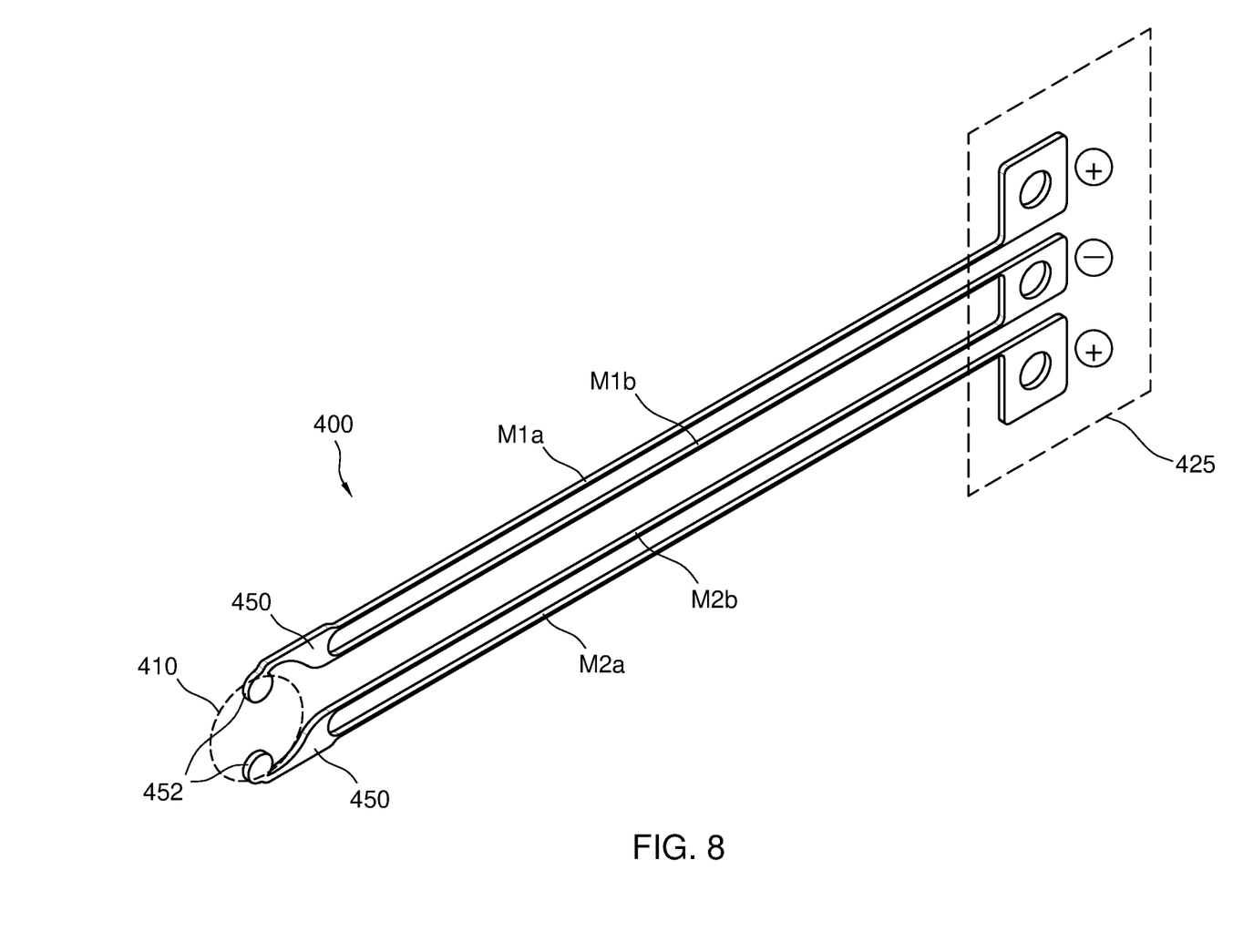
FIG. 8 shows an embodiment of an actuator mechanism of an implantable tube valve.

Tension wires M1, M2 may comprise a single-strand or multi-strand wire and may comprise multiple interconnected parts. Besides a circular cross-section, tension wires M1, M2 may have differently shaped cross-sections, e.g. rectangular, in dependence of the manufacturing process. Tension wires M1, M2 may also be hollow or comprise pockets or cut outs. Alternatively, parts of tension wires M1, M2 may be reinforced, e.g. by having an increased cross sectional area or different material properties. Tension wires M1, M2 may each be differently shaped than the other and may each comprise a different response to heating by the heating circuit 425. As an alternative embodiment, tension wires M1, M2 may each comprise multiple wires M1a, M1b and M2a, M2b respectively, e.g. to intrinsically provide a current loop to and from the heating circuit 425 as shown in FIG. 8.

The actuator connectors 450 comprise a cylindrically rounded outer surface that matches a cylindrically rounded cutout in pivot member 410, to form a rotatable connection between the actuator connector 450 and pivot member 410. The connection between actuator connector 450 and pivot member 410 may be flush to limit the extension of the tube contour 113 in lateral direction. Alternatively, an actuator connector 450 may be an integral part of pivot member 410 or of tension wire M1 and/or M2, e.g. by means of elastic hinges. Alternatively, instead of by means of actuator connectors 450, tension wires $M_1$, $M_2$ can be directly coupled to pivot member 410, e.g. by soldering, welding, gluing or threading.

Turning back to FIG. 7, pivot member 410 preferably is a substantially curved element comprising a central hole for mounting to the pivot shaft 415 and two cylindrically rounded cutouts on an edge of the pivot member for mounting the actuator connectors 450 at a radial distance from the pivot shaft 415, however the pivot member 410 may be a differently shaped body suitable for a transmission of actuation forces into an actuation torque on the pivot shaft 415, e.g. a body containing one or more cranks or levers.

Pivot member 410 is preferentially designed as a separate part on the outside of the tube 110, leading to only a very minute extension of the tube contour 113 in lateral direction. The pivot member 410 may be designed having a curved inner and outer surface concentrically aligned with the tube 110 to further limit the extension of the tube contour 113.

Heating circuit 425 is preferably geared to a wireless charging device (not shown) but may also be powered by other means, e.g. a battery pack etc. In the shown embodiment the heating circuit comprises a charging capacitor (not shown) electrically connected to a charging antenna 430 arranged along the implantable tube valve 100. The heating circuit 425 comprises corresponding logic to heat a first or second tension wire $M_1$, $M_2$ when the charging capacitor is charged with a threshold charge, charged by the charging antenna 430.

The logic may have further gearing options, e.g. a (wireless) readout, such as status check options or reset options, and is preferably operated by a coded signal that only activates the heating circuit 425 when a corresponding security code is transmitted. In its simplest form, the wireless charging system functions as a bistate switch, switching the valve member 120 from open to closed position or from closed to open, depending on the initial arrangement.

The outer surface of the tube 110 may be covered by a foundation 190, comprising a material that facilitates adhesion to the lumen of the human vessel the implantable tube valve 100 is implanted in, such as a biocompatible meshed, porous or fabric material. Alternatively, the foundation 190 or tube 110 may comprise radially extending protrusions, e.g. spikes or hooks that form a mechanical bonding with the surrounding tissue, thereby fixating the implantable tube valve 100 to the vessel lumen.

FIG. 8 shows an embodiment of an actuator mechanism 400 of an implantable tube valve 100. The actuator mechanism comprises a heating circuit 425 arranged for heating tension wires M1, M2 by means of an electrical current through the tension wires. The tension wires M1, M2 reversibly contract when heated by the heating circuit and expand when cooled, thereby providing an actuation force to the pivot member 410. Alternatively, the tension wires M1, M2 may reversibly expand when heated by the heating circuit and contract when cooled. Preferably, the tension wires $M_1$, $M_2$ are of a form that contracts when heated. Shape metal alloy suitable for such may for instance be a NiSn alloy known as Nitinol, but other shape metal alloys can be used to purpose.

The actuation force may be provided by the tension wires M1, M2 being directly coupled to the pivot member 410, e.g. by being soldered, welded, glued or threaded to each other. Preferably, at least one of the tension wires M1, M2 is coupled to a connector, with said connector being mounted in the pivot member 410. For example, each of tension wires M1, M2 may be mounted to the pivot member by means of actuator connector 450. The actuator connector 450 may comprise a cylindrically rounded end engageable with a cylindrically rounded cutout on the pivot member to form a rotatable connection. A benefit of having a cylindrically rounded contact surface between the actuator connector 450 and the pivot member 410 may be that the actuation force on the actuator connector 450 is exclusively converted into a torque on the pivot member 410, which may facilitate maintaining proper alignment between the pivot member and the actuator connector. Conversely, in e.g. a conical contact surface, the actuation force is converted into a torque as well as an axial force, possibly destabilizing or locking the connection between the pivot member 410 and the actuator connector 450. The actuator connector 450 may be an integrally formed part of the tension wires M1, M2. Alternatively, the actuator connector 450 may be a separate part which is assembled to each of tension wires M1, M2 e.g. by soldering, welding, gluing or threading.

Tension wires M1, M2 may be mechanically connected to at least two respective terminals (+) (−) of the heating circuit at one end, to provide a current running therethrough, and mechanically connected to the pivot member 410 at another end, so that the current runs through the tension wire M1$a$,$b$, and M2$a$,$b$ respectively, without branching off to the pivot member 410. Each of the tension wires M1, M2 may be electrically connected to a positive and a negative terminal on the heating circuit 425, such that a closed current loop is formed without current passing from the connector 452 to pivot member 410. This has as benefit, that no currents pass from connector 452 to pivot member 410, ensuring that connectors 452 can be freely mounted without running into fixation by microwelds that would arise from such currents.

For this purpose, each tension wire may e.g. consist of two strands, e.g. M1$a$,$b$, and M2$a$,$b$, respectively, that are conductively interconnected by an actuator connector 450. Each of the strands M1$a$ and M1$b$ are separately connected to a positive and negative terminal on the heating circuit 425, such that a closed current loop is formed. As a result, an electrical current for heating each of the tension wires M1, M2 is contained within the tension wires, instead of passing through other components of the implantable tube valve 100 such as the pivot member 410, which potentially causes the actuator connector 450 to undesirably become welded to the pivot member 410. Another benefit of the current being contained within the tension wires, is that there is a reduced risk of current leakage to tissue surrounding the implantable tube valve 100.

The invention claimed is:

1. An implantable tube valve for implanting in a human vessel, the tube valve comprising:
    a tube, having an inner tube wall and an outer tube wall that extend between two axial tube ends;
    a valve member, connected to a pivot shaft supported by the tube, wherein the valve member is pivotable between an open position and a closed position;
    an actuator mechanism that is mounted on the outer tube wall;
    a pivot member that is arranged for driving the pivot shaft from the outer tube wall by an actuation force from the actuator mechanism; and
    at least one biasing element that is connected to the pivot member and arranged for preloading the pivot member to bistably bias the valve member towards the open position or the closed position;
    wherein the pivot member is substantially curved, having a curvature following a contour of the inner tube wall to limit a lateral extension of the implantable tube valve.

2. The implantable tube valve according to claim 1, wherein the actuator mechanism comprises a heating circuit arranged for heating at least one tension wire by means of an electrical current through the tension wire, the tension wire being attached between the heating circuit and the pivot member so that by heating the tension wire provides an actuation force on the pivot member.

3. The implantable tube valve according to claim 2, wherein the tension wire is mechanically connected to at least two respective terminals of the heating circuit at one end, to provide a current running therethrough, and mechanically connected to the pivot member at another end, so that the current runs through the tension wire without branching off to the pivot member.

4. The implantable tube valve according to claim 3, wherein the at least one tension wire is coupled to a connector, and wherein the connector is mounted in the pivot member.

5. The implantable tube valve according to claim 2, wherein the at least one tension wire is coupled to a connector, and wherein the connector is mounted in the pivot member.

6. The implantable tube valve according to claim 1, wherein the at least one biasing element comprises at least two bow-shaped rods that are interconnected at both ends in a mirrored fashion.

7. The implantable tube valve according to claim 6, wherein each bow-shaped rod has a middle section with an increased bending stiffness with respect to a distal end and a proximal end section bending stiffness.

8. The implantable tube valve according to claim 6, wherein each bow shaped rod has a middle section cross-sectional area which is larger than a cross-sectional area of any end section of each bow shaped rod.

9. The implantable tube valve according to claim 1, wherein the pivot member comprises at least two opposing mounts radially extending from the pivot shaft for transferring the actuation force from the actuator mechanism to the pivot shaft.

10. The implantable tube valve according to claim 1, wherein the pivot member comprises at least one mount radially extending from the pivot shaft for transferring the preload force from the biasing element to the pivot shaft.

11. The implantable tube valve according to claim 1, wherein the tube comprises a cavity between the inner tube wall and outer tube wall, for enclosing at least the pivot member.

12. The implantable tube valve according to claim 1, wherein the at least one biasing element is a planar structure with a constant thickness.

13. The implantable tube valve according to claim 1, wherein the at least one biasing element is an integrally formed part.

14. The implantable tube valve according to claim 1, wherein the at least one biasing element comprises at least one cylindrically rounded end engageable with a cylindrically rounded cutout on the pivot member to form a rotatable connection.

* * * * *